US011041962B2

(12) United States Patent
Youssef

(10) Patent No.: US 11,041,962 B2
(45) Date of Patent: Jun. 22, 2021

(54) ADAPTIVE MULTI-RATE NAVIGATION

(71) Applicant: SONY CORPORATION, Tokyo (JP)

(72) Inventor: Mohamed Youssef, San Diego, CA (US)

(73) Assignee: SONY CORPORATION, Tokyo (JP)

(*) Notice: Subject to any disclaimer, the term of this patent is extended or adjusted under 35 U.S.C. 154(b) by 497 days.

(21) Appl. No.: 15/921,763

(22) Filed: Mar. 15, 2018

(65) Prior Publication Data
US 2018/0335524 A1 Nov. 22, 2018

Related U.S. Application Data

(60) Provisional application No. 62/507,396, filed on May 17, 2017.

(51) Int. Cl.
G01S 19/39 (2010.01)
G01S 19/34 (2010.01)
(Continued)

(52) U.S. Cl.
CPC ............ *G01S 19/393* (2019.08); *G01S 19/10* (2013.01); *G01S 19/19* (2013.01); *G01S 19/21* (2013.01);
(Continued)

(58) Field of Classification Search
CPC .......... G01S 19/19; G01S 19/21; G01S 19/22; G01S 19/24; G01S 19/26; G01S 19/39;
(Continued)

(56) References Cited

U.S. PATENT DOCUMENTS 5,884,214 A   3/1999   Krasner
6,122,960 A * 9/2000   Hutchings .............. A63B 24/00
                                                    73/493
(Continued)

FOREIGN PATENT DOCUMENTS

CN   102313892 A   1/2012
EP     2128724 A2   12/2009

OTHER PUBLICATIONS

Henkel, Patrick et al., "Multifrequency, Multisatellite Vector Phase-Locked Loop for Robust Carrier Tracking", IEEE Journal of Selected Topics in Signal Processing, vol. 3, No. 4, Aug. 2009, pp. 674-681 (Year: 2009).*

(Continued)

*Primary Examiner* — Cassi J Galt
(74) *Attorney, Agent, or Firm* — Chip Law Group

(57) ABSTRACT

A Global Navigation Satellite System (GNSS) device for adaptive multi-rate navigation includes detection of a first set of signal measurements and a second set of signal measurements from a plurality of received and acquired GNSS baseband signals. The detected second set of measurements corresponding to a plurality of measurements associated with signal blockage of the baseband signals, are eliminated. A plurality of tracking loop values are computed only from for the detected first set of signal measurements, at a defined tracking loop rate based on the received baseband signals. A motion-path of the device computed based on at least the computed plurality of tracking loop values for the detected first set of signal measurements.

22 Claims, 7 Drawing Sheets

(51) Int. Cl.
  *G01S 19/19* (2010.01)
  *G01S 19/42* (2010.01)
  *G01S 19/10* (2010.01)
  *G01S 19/21* (2010.01)
  *G01S 19/22* (2010.01)
  *G01S 19/26* (2010.01)
  *G01S 19/31* (2010.01)
  *G01S 19/24* (2010.01)

(52) U.S. Cl.
  CPC .............. *G01S 19/22* (2013.01); *G01S 19/26* (2013.01); *G01S 19/31* (2013.01); *G01S 19/34* (2013.01); *G01S 19/42* (2013.01); *G01S 19/24* (2013.01)

(58) Field of Classification Search
  CPC ................ G01S 19/393; G01S 19/396; G01S 19/35–37; G01S 19/34
  See application file for complete search history.

(56) References Cited

U.S. PATENT DOCUMENTS

| | | | |
|---|---|---|---|
| 6,272,430 B1 | 8/2001 | Krasner | |
| 7,120,191 B2* | 10/2006 | Akopian | G01S 19/29 375/147 |
| 7,495,607 B1* | 2/2009 | Zhodzishsky | G01S 19/29 342/357.31 |
| 7,889,085 B2* | 2/2011 | Downey | A63B 24/0021 340/539.13 |
| 8,884,818 B1 | 11/2014 | Sun et al. | |
| 9,720,097 B2* | 8/2017 | Martin | G01S 19/29 |
| 9,823,357 B2* | 11/2017 | Ivanov | G01S 19/13 |
| 10,627,525 B2* | 4/2020 | Wu | G01S 19/46 |
| 2002/0044087 A1 | 4/2002 | Krasner | |
| 2003/0139879 A1 | 7/2003 | Krasner | |
| 2007/0013583 A1 | 1/2007 | Wang et al. | |
| 2009/0295596 A1 | 12/2009 | Downey et al. | |
| 2013/0289872 A1* | 10/2013 | Segev | G01S 19/34 701/467 |
| 2019/0018147 A1* | 1/2019 | Calmettes | G01S 19/28 |

OTHER PUBLICATIONS

International Search Report and Written Opinion of PCT Application No. PCT/IB2018/053441, dated Sep. 27, 2018, 16 pages of ISRWO.
Goncalo Martins Tome, "Post-Processed Acquisition & Tracking of GPS C/A L1 Signals", Tecnico Lisboa, May 2015, 100 pages.
Soltanian, et al., "Utilization of Multi-Rate Signal Processing for GNSS-SDR Receivers", EURASIP Journal on Advances in Signal Processing, Article No. 42, Mar. 31, 2014, 13 pages.
Pany, et al., "Real-Time Processing and Multipath Mitigation of High-Bandwidth L1/L2 Gps Signals With a Pc-Based Software Receiver", Proceedings of the 17th International Technical Meeting of the Satellite Division of The Institute of Navigation (ION GNSS 2004), Sep. 21-24, 2004, pp. 971-985.

* cited by examiner

ADAPTIVE MULTI-RATE NAVIGATION

CROSS-REFERENCE TO RELATED APPLICATIONS/INCORPORATION BY REFERENCE

This application claims priority to U.S. Provisional Patent Application Ser. No. 62/507,396 filed on May 17, 2017, the entire content of which is incorporated herein by reference.

FIELD

Various embodiments of the disclosure relate to motion-tracking, navigation, and path detection technology. More specifically, various embodiments of the disclosure relate to a device for adaptive multi-rate navigation.

BACKGROUND

Recent advancements in satellite-based navigation have led to the development of various position and motion tracking devices that may utilize data transmitted from the satellite vehicles to track the motion of objects/devices in a specific environment. At times, such motion in different degrees of freedom may vary and may follow a complex path in a specific context. The specific context may further affect the precise measurement of the motion of the user as navigation signals from the satellite vehicles may get attenuated and signal blockage may intermittently occur at specific intervals. For example, a swimmer engaged in a swimming activity may frequently immerse under water during swimming activities. The data received from the satellite vehicles for the motion tracking of the swimmer engaged in the swimming activity may face signal outages at various positions of the swimmer.

In conventional solutions, navigation devices may be utilized to track the motion of the objects/humans based on an increase in a navigation frequency of the navigation device. Alternatively stated, conventional navigation devices may capture a higher number of location points per second as compared to traditionally captured one location point per second (or 1 Hz), at the navigation engine or circuitry of navigation devices. Such navigation devices may efficiently track motion at increased navigation frequency for objects/humans that follows a simple path in a specific environment. However, for objects that follow a complex path, a conventional navigation device may not have the ability to provide precise measurements due to lack of compensation techniques for recurring signal outages. Additionally, increasing navigation rate of the navigation device may lead to increase in power dissipation in the navigation devices, which may be a constraint for motion tracking devices that operate at low power.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A device for adaptive multi-rate navigation is provided substantially as shown in, or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
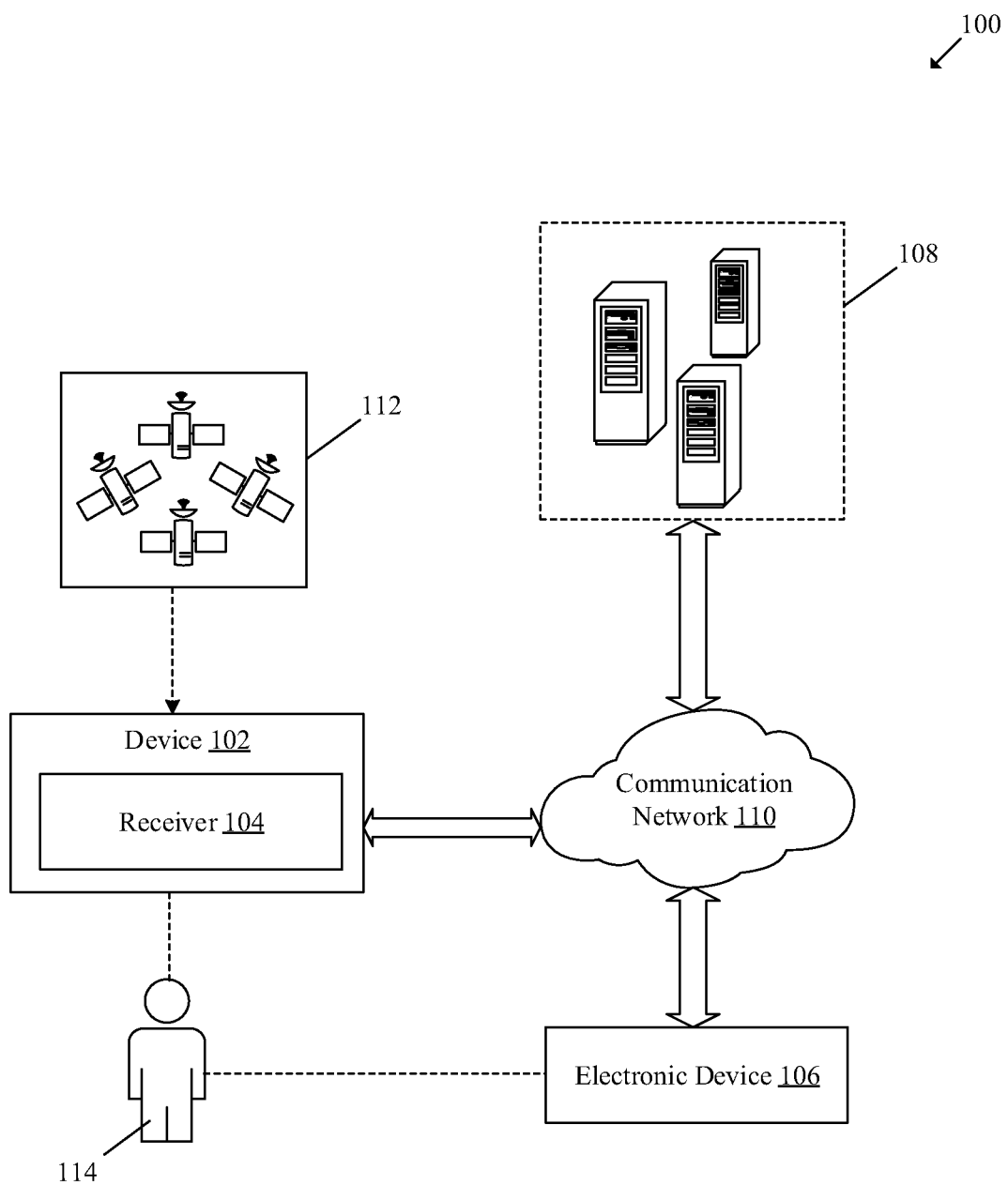
FIG. 1 is a block diagram that illustrates an exemplary network environment for an adaptive multi-rate navigation, in accordance with an embodiment of the disclosure.

The following described implementations may be found in a disclosed device for an adaptive multi-rate navigation. Exemplary aspects of the disclosure may include a device that may be affected by signal blockage or intermittent signal reception due to various reasons. For example, a Global Navigation Satellite System (GNSS) signal may include interference components from a 4th Generation-Long Term Evolution (4G-LTE) and/or a Bluetooth Low Energy (BLE) communication network. In some embodiments, the device may be a GNSS enabled portable device, for example, a wearable device. The device may comprise a receiver, which may include a measurement engine. The receiver may be a GNSS receiver. The measurement engine may be configured to detect a first set of signal measurements and a second set of signal measurements for a plurality of locations of the device from baseband signals received at the measurement engine in digital domain. The measurement engine may be further configured to eliminate the detected second set of signal measurements associated with the plurality of locations of the device. The detected second set of signal measurements may correspond to a plurality of position-fix values associated with a signal blockage of the baseband signals. The measurement engine may further compute a plurality of tracking loop values only for the detected first set of signal measurements at a defined first frequency, based on the received baseband signals. The plurality of tracking loop values may also be referred to as a plurality of tracking loop parameters. The measurement engine may be further configured to track a motion-path of the device based on at least the computed plurality of tracking loop values for the detected first set of signal measurements. Such motion path of the device may be tracked at the defined first frequency of measurement of the first set of signal measurements.

In accordance with an embodiment, the receiver in the device may further include a front-end circuit communicatively coupled to the measurement engine. The front-end circuit may be configured to receive radio frequency (RF)

signals from at least one space vehicle. The front-end circuit may be further configured to convert the received RF signals to intermediate frequency (IF) signals. The front-end circuit may be further configured to convert the IF signals to the baseband signals in the digital domain, which may be further transferred to the measurement engine.

In accordance with an embodiment, the first set of signal measurements may correspond to a plurality of position-fix values associated with a reception of the RF signals. The received RF signals associated with the first set of signal measurements may exhibit a signal quality value greater than a signal quality threshold during motion of the device. The measurement engine may be further configured to compute a plurality of integration-values for a plurality of integration-time-periods of the baseband signals, at the defined first frequency. A count of the plurality of integration-values, the plurality of integration-time-periods, and the plurality of locations may be the same and may be based on the defined first frequency. The plurality of integration-values may be computed based on non-coherent integration of the received baseband signals and a reference signal at the measurement engine. The measurement engine may be further configured to determine the second set of signal measurements associated with the plurality of locations of the device when the plurality of integration-values are less than a threshold signal power value. A signal blockage of the baseband signals for the second set of signal measurements may occur when the plurality of integration-values is less than the threshold signal power value.

In accordance with an embodiment, the measurement engine may be further configured to smoothen the detected first set of signal measurements post elimination of the detected second set of signal measurements. The detected first set of signal measurements may be smoothened for a continuous track of the motion-path of the device. In some instances, the detected first set of signal measurements may be smoothened by at least one of a least-square fitting model, an M-estimator, Kalman filter or one of its variants model for the detected first set of signal measurements. In other instances, the detected first set of signal measurements of the device may be smoothened by a machine learning-based model.

In accordance with an embodiment, the device may further comprise a speed sensor communicatively coupled to the receiver. The receiver may be a Global Navigation Satellite System (GNSS) receiver. The speed sensor may be configured to provide a first set of speed values of the device for the detected first set of signal measurements and a second set of speed values of the device for the detected second set of signal measurements. The motion path of the device may be tracked based on the first set of speed values and the computed plurality of tracking loop values of the device for the detected first set of signal measurements. The tracking loop values may be utilized in a closed loop to continuously follow code phase values and carrier phase values of the baseband signals. The tracking loop values may include three types of tracking loop (or tracking loop values), that is, code tracking loop values, frequency tracking loop values, and phase tracking loop values.

The measurement may be further configured to compute a displacement between two successive locations of the plurality of locations of the device for the track of the motion-path of the device. The displacement may be computed based on a total travel-time of RF signals received at the receiver from at least one space vehicle and the first set of speed values. The measurement engine may be further configured to determine the second set of signal measurements of the device when a second set of speed values for the second set of signal measurements exhibits a deviation from a specified speed pattern by the signal blockage of the baseband signals.

In accordance with an embodiment, the receiver in the device may further comprise a navigation engine communicatively coupled to the measurement engine. The navigation engine may be configured to receive tracking information related to the motion-path of the device, which may be tracked at the defined first frequency by the measurement engine. The navigation engine may be further configured to track the motion-path of the device based on the received tracking information from the measurement engine, at a defined navigation rate. The defined navigation rate for the navigation engine may be less than the defined first rate for the measurement engine. The defined navigation rate of the navigation engine may correspond to a tracking rate, which may be present in a range of 0.5 to up to 20 Hertz (Hz) to maintain a power dissipation value below a threshold power dissipation value. The defined first frequency of the measurement engine may correspond to the tracking rate that may be present in a range of 5 Hz to 10 Hz.

In accordance with an embodiment, the navigation engine may be configured to generate an arm trajectory of the user engaged in a swimming activity that involves repetitive motion of arms along with a travel direction. Such arm-trajectory may be generated based on the tracked motion-path of the device. In such case, the second set of signal measurements may correspond to underwater locations of the device as the user may be engaged in the swimming activity.

FIG. 1 is a block diagram that illustrates an exemplary network environment for an adaptive multi-rate navigation of a user, in accordance with an embodiment of the disclosure. With reference to FIG. 1, there is shown a network environment 100. The network environment 100 may include a device 102, an electronic device 106, a server 108, a communication network 110, and one or more space vehicles 112. Additionally, a user 114 may wear the device 102 on a specific part of the body of the user 114. The device 102 may be communicatively coupled to the electronic device 106 and the server 108, via the communication network 110.

The device 102 is a GNSS enabled device. The device 102 may comprise suitable logic, circuitry, and interfaces that may be configured to render and display a motion-path of the user 114 on a display screen associated with the device 102. The motion-path may capture different locations of the device 102 while the user 114 may be engaged in a specific activity, for example, swimming activity. Alternatively stated, the displayed motion-path of the device 102 may include a path that captures a movement of the body part associated with the device 102, for example, a motion-path of a smartwatch worn on a left wrist of a user (e.g., Alex) may also capture a continuous motion-path (or trajectory) of the left hand/wrist of the user (Alex), while the user is swimming. The device 102 may provide computational, storage, power, network communication, and other sensor-based resources for tracking of the motion-path and display of the tracked motion-path on a display screen. In some embodiments, the device 102 may be non-invasively worn on a specific part of the body of the user 114. In other embodiments, the device 102 may be implanted within or invasively attached to a particular part of the body of the user 114. Examples of the device 102 may include, but are not limited to, a smart-watch, a wearable glass, a wearable augmented reality (AR) device, a wearable virtual reality (VR) device, a smartphone, a wearable camera-enabled device, an implantable device, and a wearable headband.

The device 102 may comprise a receiver 104. The receiver 104 may be a GNSS receiver. In some embodiments, the receiver 104 may also be referred to as a receiver engine. The receiver 104 may comprise suitable logic, circuitry, and interfaces that may be configured to receive radio frequency (RF) signals from the one or more space vehicles 112 and track the motion-path of the user 114 based on the received RF signals. The receiver 104 may be installed in a package configuration, which may further specify a form factor of the receiver 104 in the device 102. Examples of the package configuration may include, but are not limited to, System on Chip (SoC)-based configuration, Field programmable gate arrays (FPGA)-based configuration, complex programmable logic device (CPLD)-based configuration, System in package (SiP)-based configuration, and Programmable System on Chip (PSoC)-based configuration.

In some embodiments, the receiver 104 may be implemented as an onboard receiver chip in the device 102. In other embodiments, the receiver 104 may be implemented as an application-specific chip that can be attached peripherally to the device 102, for example, similar to a micro Secure Digital (SD) card. Further, the receiver 104 may have a specification that describes data formats, protocols, encryptions, and the like. The specification of the receiver 104 may vary with a type of the Global Navigation Satellite System (GNSS) system in communication with the receiver 104. Examples of the constellation of the GNSS system may include, but are not limited to, a Global Positioning System (GPS), a Global Navigation Satellite System (GLONASS), an Indian Regional Navigation Satellite System (IRNSS), a Beidou System, and a Galileo System. It may be noted that the receiver 104 has been shown as embedded in the device 102; however, the disclosure may not be so limited and the receiver 104 may be implemented as a standalone device or chip, without a deviation from the scope of the disclosure.

The electronic device 106 may comprise suitable logic, circuitry, and interfaces that may be configured to analyze a plurality of locations of the device 102 attached/worn by the user 114. The electronic device 106 may be further configured to display a tracked motion-path of the device 102 attached/worn by the user 114. Examples of the electronic device 106 may include, but are not limited to, a computing device, a computer work-station, a mainframe machine, a server, a gaming device, a VR/AR device, or a consumer electronic (CE) device.

The server 108 may comprise suitable circuitry, and interfaces that may be configured to store a plurality of locations of the device 102 detected by the receiver 104 of the device 102. Additionally, the server 108 may be configured to store data associated with the tracked motion-path of the device 102. The plurality of detected locations, the tracked motion-path data of the device 102 and other metadata for the user 114 may be stored in a database in the server 108 in real time or near real time. In some embodiments, the server 108 may be implemented as a cloud server, which may be utilized to execute aforementioned operations of the server 108 through web applications, cloud applications, HTTP requests, database operations, file transfer, gaming operations, and the like.

The communication network 110 may include a communication medium through which the device 102 may be communicatively coupled to the electronic device 106 and the server 108. Examples of the communication network 110 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the device 102 may be attached or worn by the user 114 at a specific part of the body, for example, a wrist. An input trigger may be received at the device 102 to initialize reception of the RF signals from the one or more space vehicle 112. The input trigger may specify a time to track a motion-path of the device 102 as the user 114 may be engaged in a specific activity. Such specific activity may require motion of the body part wearing the device 102. In some embodiments, the specific context may be a sports activity, for example, a swimming activity, a long jump activity, a gymnastic activity, a sprint race activity, a weight-lifting activity, and the like. In other embodiments, the activity may be different from a sports activity, which may be monitored to record human-skills, for example, a driving activity, a cooking activity, or a medical operation.

Based on the received input trigger, the receiver 104 of the device 102 may be configured to receive RF signals (e.g., GPS navigation signals) from one or more space vehicles 112. The receiver 104 may down-convert the received RF signals to intermediate frequency (IF) signals. The down-converted IF signals may be further converted to analog baseband signals, which may be further digitized as digital baseband signals (hereinafter "baseband signals"). During the specific activity of the user 114, the receiver 104 may acquire a plurality of locations of the device 102 from a navigation message present in the baseband signals.

The receiver 104 may detect a first set of signal measurements and a second set of signal measurements for a plurality of locations of the device 102 from the baseband signals. The detected first set of signal measurements may provide a measure of position-fix values that precisely map the location of the device 102 during the motion of the user 114. Alternatively stated, the detected first set of signal measurements of the device 102 may correspond to a plurality of position-fix values associated with reception of the RF signals having a signal quality value greater than a signal quality threshold. The signal quality threshold may be pre-determined by the receiver 104. Similarly, the second set of signal measurements may provide a measure of a plurality of position-fix values associated with a signal blockage of the baseband signals. A signal blockage or intermittent baseband signals may refer to the various instances where the baseband signals may be affected by an object (e.g. water surface, blanking signal from another onboard component, building, and other signal obstructing objects). In such cases, Line-of-Sight (LOS) signal might be lost or LOS signal might be attenuated where the signal to noise ratio of the baseband signals may be less than a defined threshold value.

Each signal measurement in the first set of signal measurements and the second set of signal measurements may correspond to a specific portion of the baseband signals in the digital domain. Such portion may include a navigation message, a C/A code, and a PRN sequence for a specific time frame. The specific portion of the baseband signals may be a period of coherent or non-coherent integration time periods, which may be utilized to identify signal portions that exhibit a high SNR values as compared to portions that exhibit low SNR values (affected by signal blockage).

The detected first set of signal measurements and the detected second set of signal measurements may be stored and updated in dedicated databases on the server 108, in real time or near real time, via the communication network 110. The receiver 104 may further eliminate the detected second set of signal measurements of the device 102 to discard contribution of position-fix values that may be affected by noise, degradation of navigation message, or attenuation of signal power of the baseband signals. Such elimination may further facilitate the generation of the desired motion-path of the device 102. In an embodiment, the generation of the desired motion-path of the device 102 may precisely model the motion of the specific body part of the user 114.

The receiver 104 may further compute tracking loop values (i.e., tracking loop measurements or parameters) only for the detected first set of signal measurements of the device 102. The tracking loop values may be computed to gather a total travel time of the RF signals from the one or more space vehicles 112 to the receiver 104 of the device 102. Further, the tracking loop values facilitate generation of information about the positions of device 102 from the baseband signals. Therefore, the tracking loop values may be computed only for the detected first set of signal measurements of the device 102 to obtain accurate motion-path of the device 102. The computed tracking loop values may be further utilized to track the motion-path of the device 102 attached to the user 114 and engaged in the specific activity.

A measurement engine of the receiver 104 may be configured to generate tracking information (for example, displacement values between different detected locations) related to the motion-path of the device 102 worn by the user 114. The tracking information may be generated at the defined first frequency, which may be a rate at which location points of the device 102 are updated every second during the operation of the measurement engine of the receiver 104. The tracking information may be generated based on the computed tracking loop value for the detected first set of signal measurements of the device 102. The receiver 104 may further comprise a navigation engine that may be configured to track the motion-path of the device 102, at a defined navigation rate. Such defined navigation rate may be a rate at which the plurality of locations of the device 102 may be updated during navigation of the device 102 in real time or near real time during the operation of the navigation engine of the receiver 104. The plurality of locations of the device 102 may be stored and updated in a database present on the server 108, in real time or near real time, via the communication network 110.

The device 102 may further comprise a display screen that may be configured to display the tracked motion-path of the device 102. The tracked-motion path may also represent the motion-path of the specific body part of the user 114. The tracked motion-path of the device 102 may be stored in the server 108 that is connected to the device 102 through the communication network 110. Additionally, the tracked motion-path of the device 102 may further be displayed by the electronic device 106 that may be communicatively coupled to the device 102, via the communication network 110. The user 114 may be associated with the electronic device 106 and may analyze the tracked motion-path of the device 102 as displayed on the electronic device 106. The operations of the device 102 are described in detail in FIG. 2 and implementation in a specific activity has been further described in detail in FIG. 3, FIG. 4A and FIG. 4B.

Figure 2:
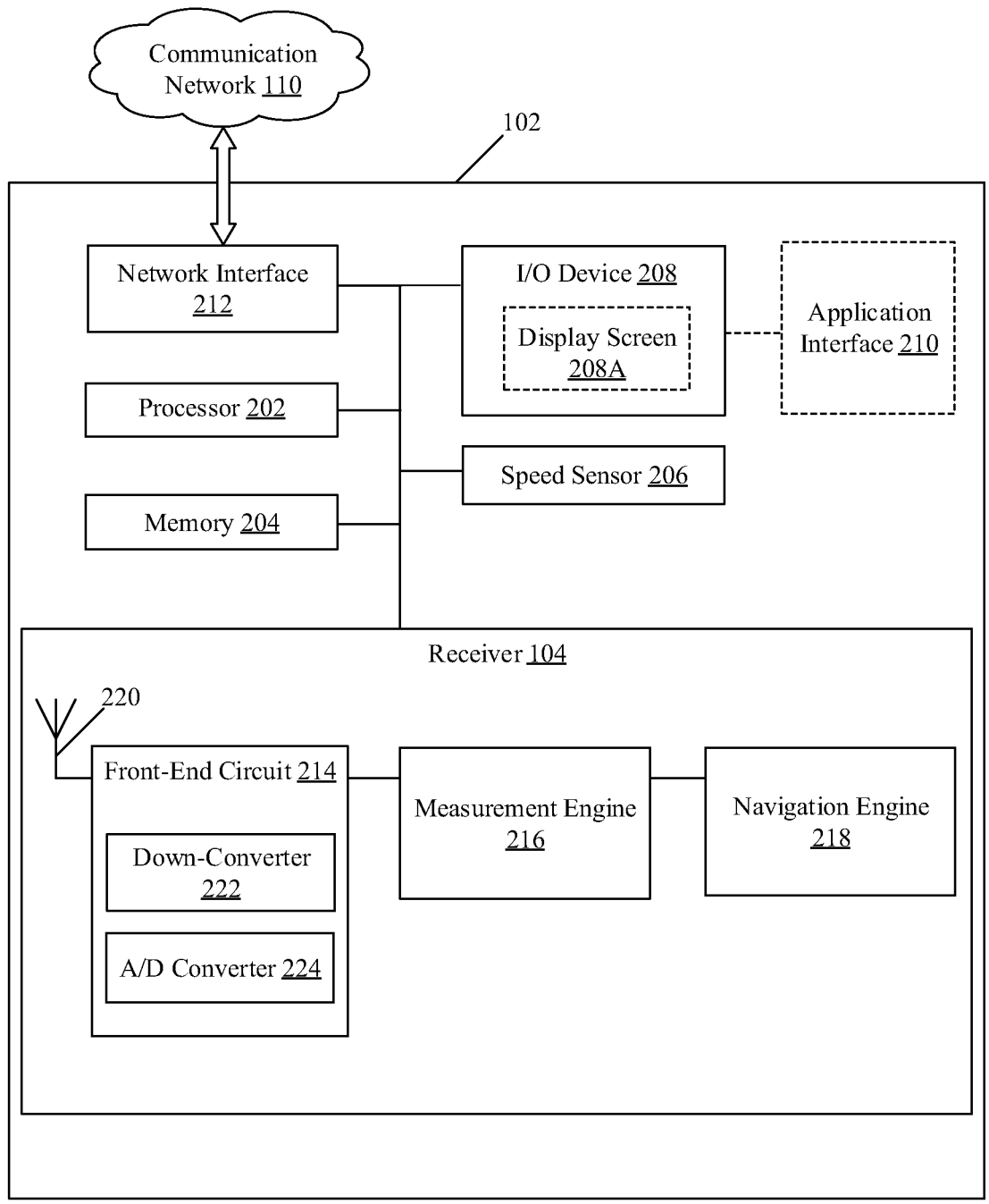
FIG. 2 is a block diagram that illustrates an exemplary device for the adaptive multi-rate navigation, in accordance with an embodiment of the disclosure.

FIG. 2 is a block diagram that illustrates an exemplary device, in accordance with an embodiment of the disclosure. FIG. 2 is explained in conjunction with elements from FIG. 1. With reference to FIG. 2, there is shown the device 102. The device 102 may include the receiver 104, a processor 202, a memory 204, a speed sensor 206, an input/output (I/O) device 208, and a network interface 212. The receiver 104 may include a front-end circuit 214, a measurement engine 216, a navigation engine 218, and an antenna 220. The I/O device 208 may include a display screen 208A, which may be utilized to render an application interface 210. The front-end circuit 214 may include a down-converter 222 and an analog-to-digital (A/D) converter 224. The processor 202 may be communicatively coupled to the receiver 104, the memory 204, the speed sensor 206, the I/O device 208, and the network interface 212. The network interface 212 may be configured to communicate with the electronic device 106 and the server 108, via communication network 110.

The processor 202 may comprise suitable logic, circuitry, interfaces that may be configured to execute a set of instructions stored in the memory 204. The processor 202 may be implemented based on a number of processor technologies known in the art. Examples of the processor 202 may be a Central Processing Unit (CPU), an x86-based processor, an x64-based processor, a Reduced Instruction Set Computing (RISC) processor, an Application-Specific Integrated Circuit (ASIC), a Complex Instruction Set Computing (CISC) processor, a field-programmable gate array-based processor, a specialized digital signal processor (DSP), or other processors, and the like. For example, the CPU and the DSP may work concurrently to detect locations of the device 102. In such a case, the navigation signals may be processed by the DSP and the locations of the device 102 may be computed by the CPU.

The memory 204 may comprise suitable logic, circuitry, and interfaces that may be configured to store a set of instructions executable by the processor 202. The memory 204 may be configured to store data of operating systems and associated applications. The memory 204 may be further configured to store instructions and control signal data that may be utilized to determine a plurality of locations of the device 102, during the specific activity of the user 114. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

The speed sensor 206 may comprise suitable logic, circuitry, and interfaces that may be configured to detect the speed value of the device 102 attached to the user 114 based on the motion of the user 114 engaged in the specific activity. The speed sensor 206 may be further configured to provide the detected speed value to the receiver 104. Examples of the speed sensor 206 may include but are not limited to, an accelerometer-based speed sensor, a gyro meter based speed sensor, a Passive Infrared Sensor (PIR)-based speed sensor, a sensor based on an inertial navigation system.

The I/O device 208 may comprise suitable logic, circuitry, and interfaces that may be configured to receive an input from the user 114 and provide an output to the user 114 based on received input from the user 114. For example, the I/O device 208 may be utilized to initialize acquisition of location data or to track the motion of a specific body part of the user 114, by the device 102. The I/O device 208 may comprise various input and output devices, which may be configured to communicate with the processor 202. Examples of the I/O device 208 may include, but are not limited to, a touch screen, a keyboard, a mouse, a joystick, a microphone, a display screen (for example, the display screen 208A), and a speaker.

The display screen 208A may comprise suitable logic, circuitry, and interfaces that may be configured to render the application interface 210 at the display screen 208A, for a presentation of a motion-path of the device 102 attached with the user 114 tracked in real time or near real time. In accordance with an embodiment, the display screen 208A may be configured to receive input from the user 114. In such a scenario, the display screen 208A may be a touch screen, which may enable the user 114 to provide input. The touch screen may be at least one of a resistive touch screen, a capacitive touch screen, or a thermal touch screen. In accordance with an embodiment, the display screen 208A may receive the input through a virtual keypad, a stylus, a gesture-based input, or a touch-based input. The display screen 208A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display screen 208A may refer to a display screen of a smart-glass device, a see-through display, a projection-based display, an electro-chromic display, or a transparent display.

The application interface 210 may correspond to a user interface (UI) rendered on a display screen, such as the display screen 208A. In accordance with an embodiment, the application interface 210 may be further rendered on an electronic device, such as the electronic device 106. The application interface 210 may utilize to display the tracked motion-path of the user 114. An example of the application interface 210 may include, but is not limited to, a graphical user interface (GUI).

The network interface 212 may comprise suitable logic, circuitry, and interfaces that may be configured to facilitate communication between the device 102, the electronic device 106, and the server 108, via the communication network 110. The network interface 212 may be implemented by use of various known technologies to support wired or wireless communication of the device 102 with the communication network 110. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may communicate via wireless communication with networks, such as the Internet, an Intranet or a wireless network, such as a cellular telephone network, a wireless local area network (LAN), and a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The front-end circuit 214 may comprise suitable logic, circuitry, and interfaces that may be configured to facilitate the acquisition of the RF signals from the one or more space vehicles 112, via the antenna 220 and convert the received RF signals to the baseband signals in the digital domain. In some embodiments, the front-end circuit 214 may be implemented as a circuitry coupled externally to the receiver 104 of the device 102. In such an implementation, the front-end circuit 214 may include different digital signal processing components communicatively coupled to different analog signal processing components, for example, analog filters, amplifiers, down-converters, A/D converters, and the like. In other embodiments, the front-end circuit 214 may be embedded within the receiver 104 of the device 102. Computational resources of the front-end circuit 214 may be shared with the processor 202 or a cluster of processors present within the device 102, to perform the functions of the front-end circuit 214.

The measurement engine 216 may comprise suitable logic, circuitry, and interfaces that may be configured to detect a plurality of locations of the device 102. In some embodiments, the measurement engine 216 may be a measurement circuit. The measurement engine 216 may be further configured to generate tracking information related to a motion-path of the device 102 at a defined first frequency of measurement. Such tracking information may be generated based on computation of displacement between two successive locations. In some embodiments, the measurement engine 216 may be implemented as a circuitry coupled externally to the receiver 104 of the device 102. Computational resources of the measurement engine 216 may be shared with the processor 202 or a cluster of processors present within the device 102, to perform the functions of the measurement engine 216.

The navigation engine 218 may comprise suitable logic, circuitry, and interfaces that may be configured to track the generated motion-path of the device 102, at the defined navigation rate. Alternatively stated, the generated motion path may be updated with one or more detected locations at the defined navigation rate, for example, locations may be updated at "1 Hz" based on "5 Hz" tracking information received from the measurement engine 216. In some embodiments, the navigation engine 218 may be implemented as a circuitry coupled externally to the receiver 104 of the device 102. In some embodiments, the navigation engine 218 may be a navigation circuit within the receiver 104. Computational resources of the navigation engine 218 may be shared with the processor 202 or a cluster of processors present within the device 102, to perform the functions of the navigation engine 218.

The antenna 220 may comprise suitable logic, circuitry, and interfaces that may be configured to receive the RF signals from one or more space vehicles 112. The antenna 220 may be configured to amplify the received RF signals and transmit to the front-end circuit 214. Examples of the antenna 220 may include, but are not limited to, a Quadrifilar Helix antenna, a Patch antenna, a Microstrip antenna, a Choke Ring antenna, a Spiral Helix antenna, and a Planar ring antenna. The down-converter 222 may comprise suitable logic, circuitry, and interfaces that may be configured to down-convert the received RF signals to IF signals. The down-converter 222 may be further configured to convert the IF signals to analog baseband signals. Examples of the down-converter 222 may include, but are not limited to, System on Chip (SoC), based on Phase Locked Loop (PLL) or Voltage-Controlled Oscillator (VCO). The (A/D) converter 224 may comprise suitable logic, circuitry and interfaces that may be configured to convert the analog baseband signals to digital baseband signals (hereinafter, "baseband signals"). Examples of the (A/D) converter 224 may include, but are not limited to, Flash (A/D) converter, Pipelines (A/D) converter, Successive Approximation Register (SAR) converters, Integrating or Dual-Slope (A/D) converter, Sigma-Delta (A/D) converter.

In operation, RF signals that carry navigation data for the device 102 may be received at the front-end circuit 214, via the antenna 220 of the receiver 104. At times, the received RF signals may exhibit significant loss of signal power due to atmospheric conditions, for example, scintillation, propagation, noise addition, absorption or refraction of RF signals due to Ionosphere and Troposphere. Such atmospheric conditions may affect the signal-to-noise ratio (SNR) as well as the figure of merit (FOM) or sensitivity of the receiver 104 for the RF signals. The antenna 220 may further amplify the received RF signals and transmit the amplified RF signals to the front-end circuit 214. The down-converter 222 present in the front-end circuit 214 may be configured to down-convert the received RF signals to IF signals. Further, the down-converter 222 may be configured to convert the IF signals to baseband signals. The (A/D) converter 224 may be configured to convert the baseband signals from analog domain to digital domain. The front-end circuit 214 may be configured to provide the baseband signals in the digital domain to the measurement engine 216.

The baseband signals may include a coarse/acquisition pseudo-random (C/A PRN) code and a navigation message spread across a specific duration of the baseband signals, for example, a portion of the navigation message spread out for "1 millisecond" of data of baseband signals. In order to identify the portion of the baseband signals that may be utilized to distinguish between precise location fixes and imprecise location fixes, a correlation of the baseband signals with a locally generated C/A PRN code may be done. Such reference (or local) C/A PRN code may be locally generated by the measurement engine 216. In some instances, the baseband signals and the reference PRN code may be correlated to find a header of the C/A PRN code of the baseband signals.

In accordance with an embodiment, the measurement engine 216 may be configured to correlate the baseband signals with the reference PRN code that is generated by the measurement engine 216. The reference PRN code and a portion of the baseband signals may only match with each other or provide a high correlation value when bit values of the reference PRN code match bitwise with the portion of the baseband signals. The correlation values so obtained may be further utilized to compute a plurality of tracking loop values for the acquired plurality of locations of the device 102. Such correlation values may be further utilized to identify portion of the baseband signals used to segregate a set of precise location values and a set of imprecise location values from the detected plurality of locations. In some embodiments, such segregation may be done through estimation of coherent sums followed by estimation of a non-coherent sum of the tracked GNSS signal. Initially, the measurement engine 216 may coherently integrate the correlation values for specific time segments of the baseband signals within a first time period, to get a coherent sum for the first time period. For example, each correlation value of "1-millisecond" duration of the baseband signals may be integrated with another "19 correlation values" of 1 millisecond" duration of the baseband signals to get the coherent sum for a first time period of "20 milliseconds". Similarly, the coherent sum for different durations of the baseband signals may be further estimated, which may be in a range of "1 millisecond" to "20 milliseconds". Thereafter, the measurement engine 216 may be configured to non-coherently integrate the coherent sum for the first time period of the baseband signals with different coherent sums for different portion of the baseband signals. Such non-coherent integration may be done to compute a plurality of integration values for a second time period of the baseband signals. The second time period (hereinafter "integration-time-periods") for the non-coherent integration may be selected to ascertain an optimal number of good locations (precise locations) at the defined first frequency of measurement.

For the non-coherent integration, the plurality of integration values may be referred to as integrate- and dump-measurement (ID) values derived from the baseband signals. The ID measurement values may include a portion of the pseudo-range measurement values for a specific portion of the baseband signals. Such pseudo-range measurement values may include both of code tracking loop measurement values and carrier tracking loop measurement values. The code tracking loop measurement values may be based on a delay lock loop (DLL) and the carrier tracking loop measurement values may be based on a frequency lock loop/automatic frequency control (FLL/AFC) and a phase lock loop (PLL).

In one example, if the defined first frequency of measurement is "10 Hz", the coherent sum of "20 milliseconds" may be iteratively integrated with four other coherent sum of "20 milliseconds" each to obtain a non-coherent sum for "100 milliseconds" of the baseband signals. In another example, if the defined first frequency of measurement is "5 Hz", the coherent sum of "20 milliseconds" may be iteratively integrated with nine other coherent sum of "20 milliseconds" each to obtain a non-coherent sum for "200 milliseconds" of the baseband signals. A value of the non-coherent sum for a portion of the baseband signals that is above a signal quality threshold may be utilized to infer that the portion of the baseband signal (or the navigation message) exhibits a high SNR value. A detected location of the device 102 (or the specific body part of the user) for such portion of the baseband signals may be determined as a good location fix. Accordingly, a value of the non-coherent sum for a portion of the baseband signals that is below a signal quality threshold may be utilized to infer that the portion of the baseband signals (or a portion of the navigation message) exhibits a low SNR value. A detected location of the device 102 (or the specific body part of the user) for such portion of the baseband signals may be determined as a bad location fix.

The coherent and non-coherent integration may be utilized to increase the SNR of the baseband signals. For example, if a detected location is a bad location fix based on low SNR value for "50 milliseconds" of the baseband signals data, then a good location fix may be obtained based on an increase in SNR for "100 milliseconds" of the baseband signals data. The plurality of integration values may be further utilized to distinguish the locations associated with a signal quality value less than a signal quality threshold from the acquired plurality of locations. The count of integration values, the integration-time-periods and the number of locations may be same in number and may be based on the defined first frequency.

The measurement engine 216 may be configured to detect a first set of signal measurements and a second set of signal measurements for the plurality of locations of the device 102. The first set of signal measurements and the second set of signal measurements may be detected based on the computed plurality of integration values. The detected first set of signal measurements for the plurality of locations may correspond to a plurality of position-fix values associated with a reception of the baseband signals, with a signal quality value greater than the signal quality threshold, during motion of the device 102. The detected second set of signal measurements, for the plurality of locations of the device 102, may correspond to a plurality of position-fix values having the plurality of integration-values less than a threshold signal power value. The plurality of integration-values that may be less than the threshold signal power value may indicate a signal blockage of the baseband signals for the second set of signal measurements. The measurement engine 216 may be configured to eliminate the detected second set of signal measurements. The elimination of the detected second set of signal measurements may further facilitate the generation of the precise motion-path of the device 102 based on the first set of signal measurements.

In some embodiments, the detected first set of signal measurements may include position fix values that may be less than a required number of position fix values that may be required in accordance with the defined first frequency of measurement. Alternatively stated, the measurement engine 216 may output location points at a rate (location points per second) that is below an optimal rate of generation locations points. For example, if the defined first frequency is 5 Hz and the detected first set of signal measurements drops below 5 position fixes for the defined first frequency, the measurement engine 216 may implement different statistical techniques to compensate for such deficiency of position fixes. In such cases, the measurement engine 216 may be configured to smoothen the detected first set of signal measurements associated with the plurality of locations of the device 102 post an elimination of the detected second set of signal measurements. The plurality of locations of the device 102 may be acquired from a navigation message at a first frequency of measurement from the baseband signals. The plurality of locations may include various locations of the device 102 that may further map precise location values of the device 102.

Such smoothening may be done to ensure that the motion-path the device 102 is continuously tracked in real time or near real time. The detected first set of signal measurements may be smoothened based on at least one of a plurality of techniques, such as a least-square fitting model, an M-estimator model, a single-state Kalman filter, a machine learning-based model and the like. The first set of signal measurements may be smoothened advantageously to add a resolution and robustness to the detected first set of signal measurements, in situations of significant signal blockage.

In order to track the motion-path of the device 102 worn by the user 114 engaged in a specific activity, the measurement engine 216 may track the locations of the device 102 at a plurality of positions in the motion-path of the device 102. The more number of positions tracked may be advantageously utilized to granularly map different movements of the specific body part of the user 114 and further provide a precise and accurate motion-path of the specific body part of the user 114, during the specific activity.

In accordance with an embodiment, the device 102 may comprise the speed sensor 206 that may be configured to detect a speed value of the device 102 in motion. The speed sensor 206 may be configured to detect a first set of speed values of the device 102 for the detected first set of signal measurements and a second set of speed values of the device 102 for the detected second set of signal measurements. The second set of speed values for the detected second set of signal measurements may exhibit a deviation from a specified speed pattern due to the signal blockage of the baseband signals.

In accordance with an embodiment, the measurement engine 216 may be configured to compute a plurality of tracking loop values only for the detected first set of signal measurements based on the correlation values. In some embodiments, the tracking loop values may be computed for the smoothened first set of signal measurements of the device 102.

The measurement engine 216 may further be configured to determine a total travel-time of RF signals received at the receiver 104 from the one or more one space vehicle 112. The total time-travel of RF signals may be determined based on a phase-shift (time-shift) of the reference C/A PRN code of the baseband signals to match with the C/A PRN code of the baseband signals. Such match of the C/A PRN code of the baseband signals with the reference PRN code may be done by the measurement engine 216.

The measurement engine 216 may be further configured to compute a displacement between two successive locations of the plurality of locations of the device 102. Such displacement may be computed between every two successive epochs to identify an actual path of motion of the device 102 (or the specific body part of the user 114) and to further track of the motion-path of the device 102. The measurement engine 216 may be configured to compute the displacement based on the determined total travel-time of RF signals received at the receiver 104 and the detected first set of speed values.

The measurement engine 216 may generate tracking information related to the motion-path of the device 102 at the defined first frequency, based on the computed tracking loop values and the detected first set of speed values. The defined first frequency may correspond to the tracking rate of the measurement engine 216 that may be in a range of 5 Hz to 10 Hz. The generated tracking information related to the motion-path of the device 102 may be provided to the navigation engine 218 in real time or near real time.

In accordance with an embodiment, the navigation engine 218 may be configured to receive the generated tracking information related to the motion-path of the device 102. The navigation engine 218 may be configured to track the motion-path of the device 102 worn by the user 114 in motion, at the defined navigation rate, based on the received tracking information from the measurement engine 216. The defined navigation rate may be the frequency at which the locations of the device 102 may be updated to the motion-path of the device 102. The defined navigation rate may correspond to a tracking rate that may be in a range of 0.5 Hz to 2 Hz.

The defined navigation rate may be less than the defined first frequency, to advantageously minimize power consumption in the receiver 104, which may otherwise drain the battery of the device 102 in a lesser amount of time. The navigation engine 218 may display the tracked motion-path of the device 102 on a display screen, such as the display screen 208A or the electronic device 106.

In accordance with an embodiment, the device 102 may be utilized by the user 114 engaged in swimming activity. In such cases, the navigation engine 218 may be configured to track the motion-path of the device 102 worn by the user 114. The navigation engine 218 may be configured to generate an arm trajectory of the user 114 engaged in the swimming activity based on the tracked motion-path of the device 102 worn by the user 114. The motion of the device 102 engaged in the swimming activity may involve repetitive motion of arms along a travel direction. In such scenarios, the first set of signal measurements may correspond to a plurality of locations when the device 102 engaged in the swimming activity is above water. The second set of signal measurements may correspond to underwater locations of the device 102 worn by the user 114 engaged in the swimming activity. The baseband signals at the underwater locations of the device 102 may be affected by signal blockage. The navigation engine 218 may output the generated arm trajectory of the user 114 at application interface 210 of the display screen 208A of the device 102 or at the electronic device 106. In accordance with an embodiment, the device 102 may retrieve the tracked motion-path of the user 114 stored in the server 108. Some of the functions or operations of the device 102 may be implemented by the server 108, without deviation from the scope of the disclosure.

Figure 3:
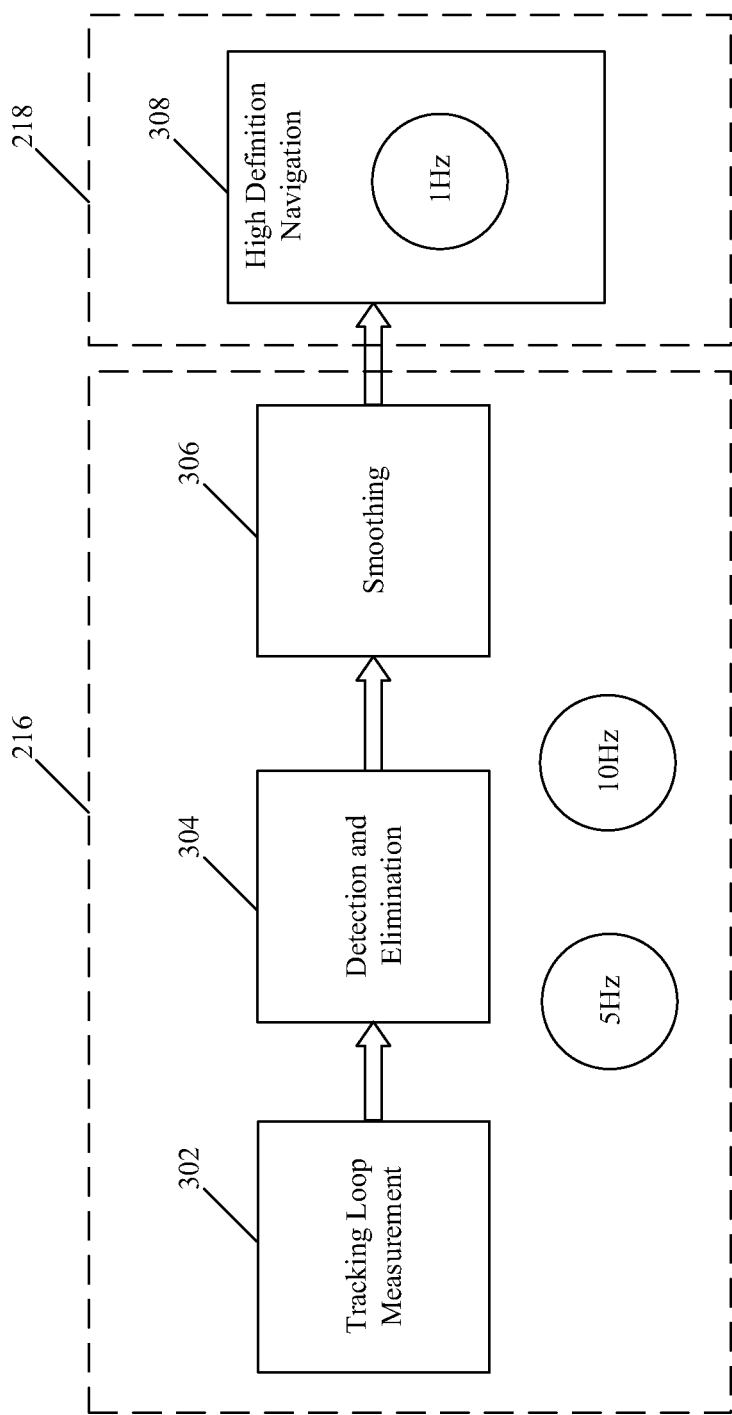
FIG. 3 illustrates a processing pipeline to depict operations of the device of FIG. 2 for the adaptive multi-rate navigation, in accordance with an embodiment of the disclosure.

FIG. 3 illustrates a processing pipeline to depict the operations of the disclosed device for adaptive multi-rate navigation. FIG. 3 is explained in conjunction with elements from FIG. 1 and FIG. 2. In FIG. 3, there is shown a processing pipeline that comprises operations 302 to 306 in the measurement engine 216 and an operation 308 in the navigation engine 218.

At 302, a tracking loop measurement of a plurality of locations of the device 102 may be done. The measurement engine 216 may be configured to execute the tracking loop measurement of the plurality of locations of the device 102. The measurement engine 216 may receive the baseband signals in digital domain from the front-end circuit 214. The measurement engine 216 may acquire a plurality of locations of the device 102 worn by the user 114, from the received baseband signals. The measurement engine 216 may further compute a plurality of integration values for the plurality of integration-time-periods, based on non-coherent integration of the coherent sum of the estimated correlation values. The plurality of integration values may be utilized to distinguish the locations from the acquired plurality of locations based on the signal quality value.

At 304, the measurement engine 216 may detect a first set of signal measurements and a second set of signal measurements for the plurality of locations of the device 102 worn by the user 114. The first set of signal measurements and the second set of signal measurements may be detected based on the plurality of integration values. The detected first set of signal measurements for the plurality of locations may correspond to the plurality of position-fix values associated with receipt of the baseband signals having a signal quality value greater than a signal quality threshold during motion of the device 102. The detected second set of signal measurements for the plurality of locations of the device 102 may correspond to the plurality of position-fix values when the plurality of integration-values are less than the threshold signal power value. The detected second set of signal measurements of the device 102 may be associated with imprecise motion-path of the device 102 worn by the user 114. The measurement engine 216 may eliminate the detected second set of signal measurements of the device 102 that correspond to the plurality of locations that indicate the signal blockage of the baseband signals. The elimination of the detected second set of signal measurements may result in tracking the desired motion-path of the device 102 attached to the user 114.

At 306, the measurement engine 216 may smoothen the detected first set of signal measurements post elimination of the second set of signal measurements at the defined first frequency. The detected first set of signal measurements may include position fix values that are less than the required number of position fix values. In such case, the measurement engine 216 may smoothen the detected first set of signal measurements to obtain the required number of position fix values for optimal number of locations per second. The measurement engine 216 may smoothen the detected first set of signal measurements based on at least one of a least-square fitting model, an M-estimator model, a Kalman filter a machine learning-based model for the detected first set of signal measurements. The detected first set of signal measurements may be smoothened to add resolution and robustness to the detected first set of signal measurements, in situations of significant signal blockage of baseband signals. The measurement engine 216 may be configured to generate the tracking information related to the motion-path of the device 102 worn by the user 114. The tracking information related to the motion-path of the device 102 may be generated at the defined first frequency of measurement. The measurement engine 216 may be further configured to provide the generated tracking information to the navigation engine 218.

At 308, the navigation engine 218 may track the motion-path of the device 102 worn by the user 114, at the defined navigation rate (e.g. 1 Hz). The defined second navigation rate may correspond to the frequency at which the locations of the device 102 may be updated in the motion path of the device 102 worn by the user 114. The navigation engine 218 may be further configured to generate a trajectory of the motion-path of the device 102 worn by the user 114. The operations at 302, 304 and 306 of the processing pipeline in FIG. 3 may be executed by the measurement engine 216 at the defined first frequency (for e.g. 5 Hz or 10 Hz). The operation 308 of the processing pipeline in FIG. 3 may be executed by the navigation engine 218 at the defined navigation rate (e.g. 1 Hz).

Figure 4A:
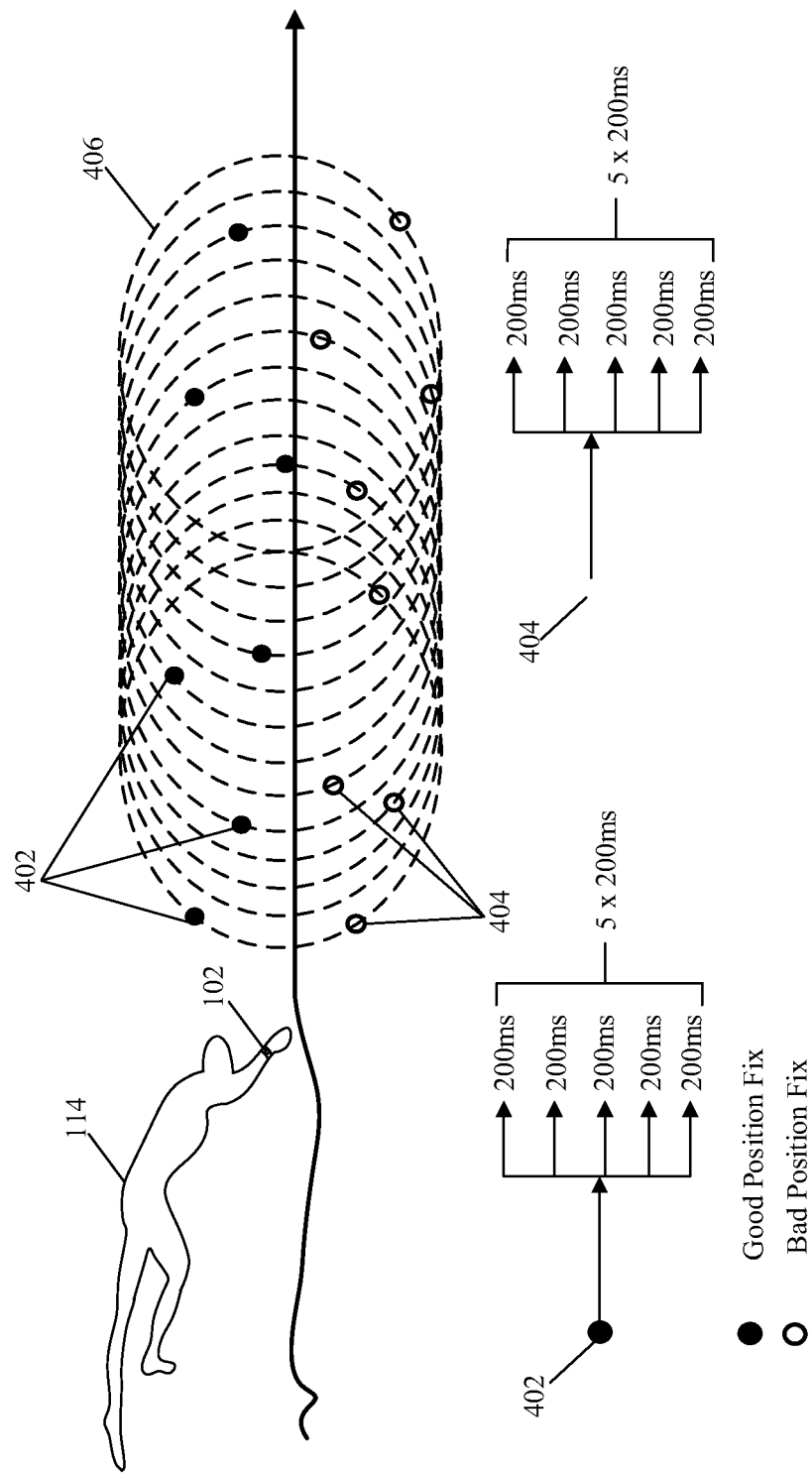
FIG. 4A and FIG. 4B illustrates a first exemplary scenario and a second exemplary scenario, respectively, for implementation of the disclosed device of FIG. 2 for adaptive multi-rate navigation, in accordance with an embodiment of the disclosure.
Figure 4B:
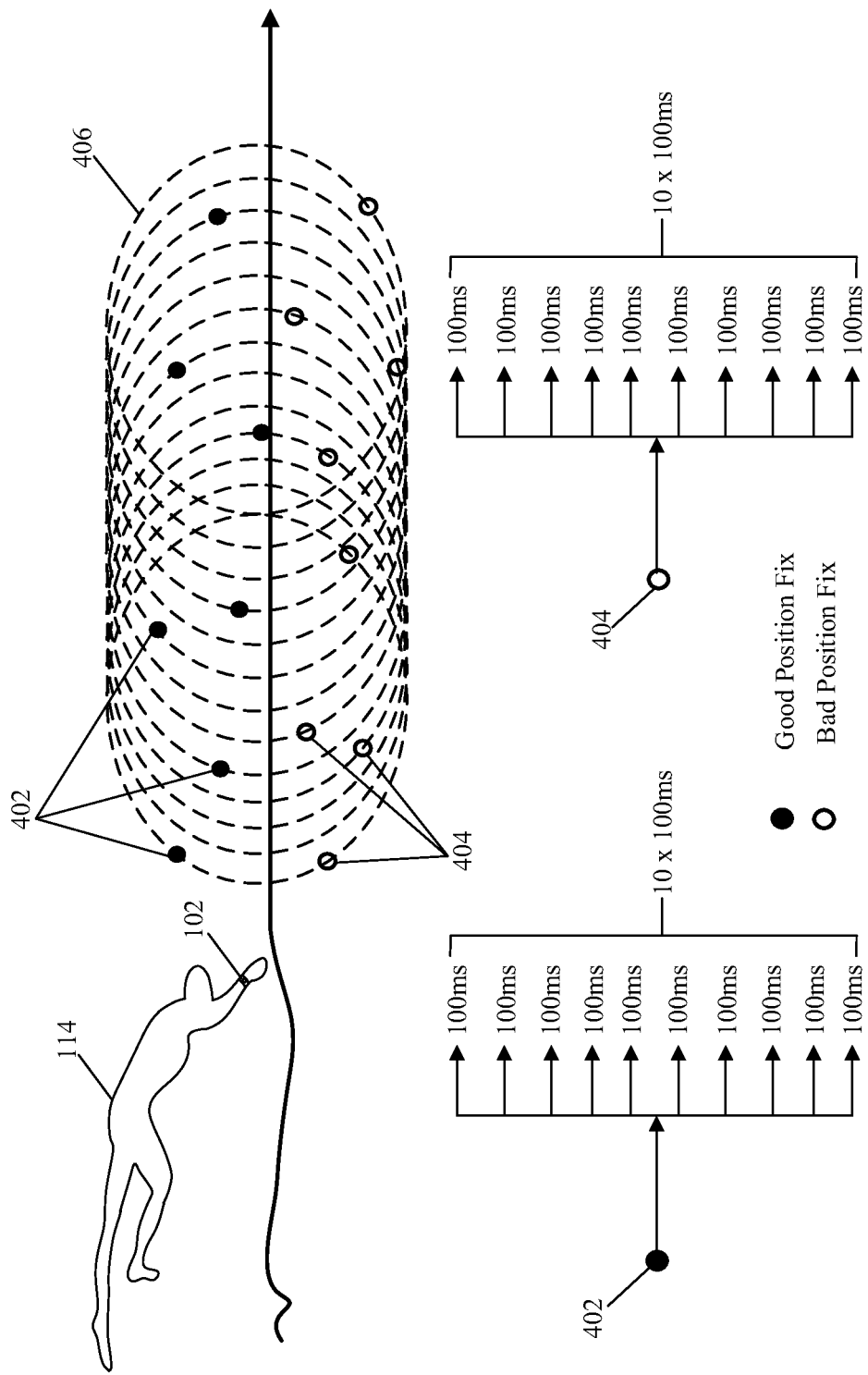

FIG. 4A and FIG. 4B illustrate a first exemplary scenario and a second exemplary scenario respectively, for implementation of the disclosed device for adaptive multi-rate navigation, in accordance with an embodiment of the disclosure. FIG. 4A and FIG. 4B are collectively explained in conjunction with elements from FIGS. 1, 2, and 3. In accordance with the first exemplary scenario and the second exemplary scenario as illustrated in FIG. 4A and FIG. 4B, the device 102 may be a wearable device. In accordance with an embodiment, with reference to FIG. 4A and FIG. 4B, the device 102 may be a GNSS enabled wearable device. With reference to FIG. 4A and FIG. 4B, there is shown a view of a swimming environment that includes the device 102 worn by the user 114 and engaged in a swimming activity, a first set of signal measurements 402 of the device 102 during the activity, a second set of signal measurements 404 of the device 102 during the activity, and an arm trajectory 406 of the user 114.

In accordance with the first exemplary scenario and the second exemplary scenario, the device 102 may be configured to track the motion-path of the user 114 engaged in the swimming activity. In accordance with the first scenario and the second scenario, the user 114 may wear the device 102 on any desired arm when engaged in the swimming activity. As the user 114 may enter the swimming pool, the user 114 may be at rest without any motion. In such situation, the measurement engine 216 may detect a location of the device 102 as a rest location with a zero location update. Such location may be an initial position of the user 114, and the user 114 may form a swimming posture to start the swimming activity. The user 114 may dive into the water and start the swimming activity from the initial location. While engaged in the swimming activity, the arms of the user 114 may be underwater at some instances and may be above water at some other instances. The RF signals received by the device 102 when the user 114 may be engaged in the swimming activity may be affected by signal blockage when the device 102 worn by the user 114 on any of its arms may be underwater. The locations tracked by the measurement engine 216 may be inaccurate when the device 102 worn by the user 114 is underwater. While the user 114 may be engaged in the swimming activity, the measurement engine 216 may acquire a plurality of locations of the device 102 from the received baseband signals. The measurement engine 216 may compute the plurality of integration values for the plurality of integration-time-periods of the received baseband signals based on coherent and/or non-coherent integration of the better correlation values of the baseband signals.

The count of integration values computed may be "5" and the integration time period may be "200 ms" for the defined first frequency, that is, "5 Hz", for example as shown in FIG. 4A. The count of integration values may be "10" and the integration time period may be "100 ms" for the defined first frequency, that is, "10 Hz", for example as shown in FIG. 4B.

The measurement engine 216 may detect the first set of signal measurements 402 and the second set of signal measurements 404 for the plurality of locations of the device 102 during the swimming activity. The first set of signal measurements 402 and the second set of signal measurements 404 may be detected based on the computed plurality of integration values. The detected second set of signal measurements 404 may correspond to the plurality of position fix values where the user 114 may be underwater during the swimming activity. The measurement engine 216 may further eliminate the detected second set of signal measurements 404 that correspond to the plurality of locations that indicate the device 102 to be underwater.

The measurement engine 216 of the device 102 may execute the operations (as described in FIG. 2) to track the motion path of the device 102 worn by the user 114. The measurement engine 216 may generate the tracking information related to the motion path of the device 102 worn by the user 114 on any of the arms when the user 114 is engaged in the swimming activity. The navigation engine 218 may update the tracked locations of the device 102 worn by the user 114 based on the tracking information received from the measurement engine 216. Further, the navigation engine 218 may generate the arm trajectory 406 of the user 114 engaged in the swimming activity based on the updated locations of the device 102.

In accordance with the first scenario and the second scenario, as shown in FIGS. 4A and 4B, the user 114 may be engaged in the swimming activity based on various swimming techniques, such as front crawl, breaststroke, butterfly stroke, backstroke, sidestroke, and the like. The motion of the arms of the user 114 may be different for different swimming techniques. In some scenarios, the user 114 may swim forward with zig-zag or spiral motion of the arms. In some other scenarios, the user 114 may swim forward with the looping movement of the arms.

In some cases, the device 102 worn by the user 114 on at least one arm, maybe above water level for a maximum duration of the swimming activity. In some other cases, the device 102 worn by the user 114 may be underwater for a maximum duration of the swimming activity. The RF signals received by the device 102 may be profoundly affected by a signal blockage in cases when the device 102, in case of wearable, may stay underwater for the maximum duration of the swimming activity.

In some scenarios, the motion-path of both the arms of the user 114 may be tracked. The user 114 may wear the device (such as the device 102) on either of the arms/wrist. The device 102 may track the motion-path of a specific arm of the user 114, when the user 114 is engaged in the swimming activity. In some other scenarios, the user 114 may dive deep into the water while swimming, such that the RF signals received by the receiver 104 may be affected by the signal blockage. In such scenarios, the measurement engine 216 of the device 102 may be configured to track the motion-path of the device 102 based on smoothening of the detected first set of signal measurements (such as the first set of signal measurements 402).

Although the first exemplary scenario and the second exemplary scenario as illustrated by FIG. 4A and FIG. 4B exhibit the device 102 as a wearable device utilized in the swimming activity, nonetheless, in accordance with an embodiment, the device 102 may be utilized as a wearable device in some other activities. Examples of such other activities may be a long jump activity, a gymnastic activity, a sprint race activity, a weightlifting activity, and the like. In other embodiments, the activity may be different from a sports activity, which may be monitored to record human-skills, for example, a driving activity, a cooking activity, or a medical operation. In accordance with another embodiment, the device 102 may be a GNSS enabled portable device that may be utilized in a plurality of activities.

Figure 5A:
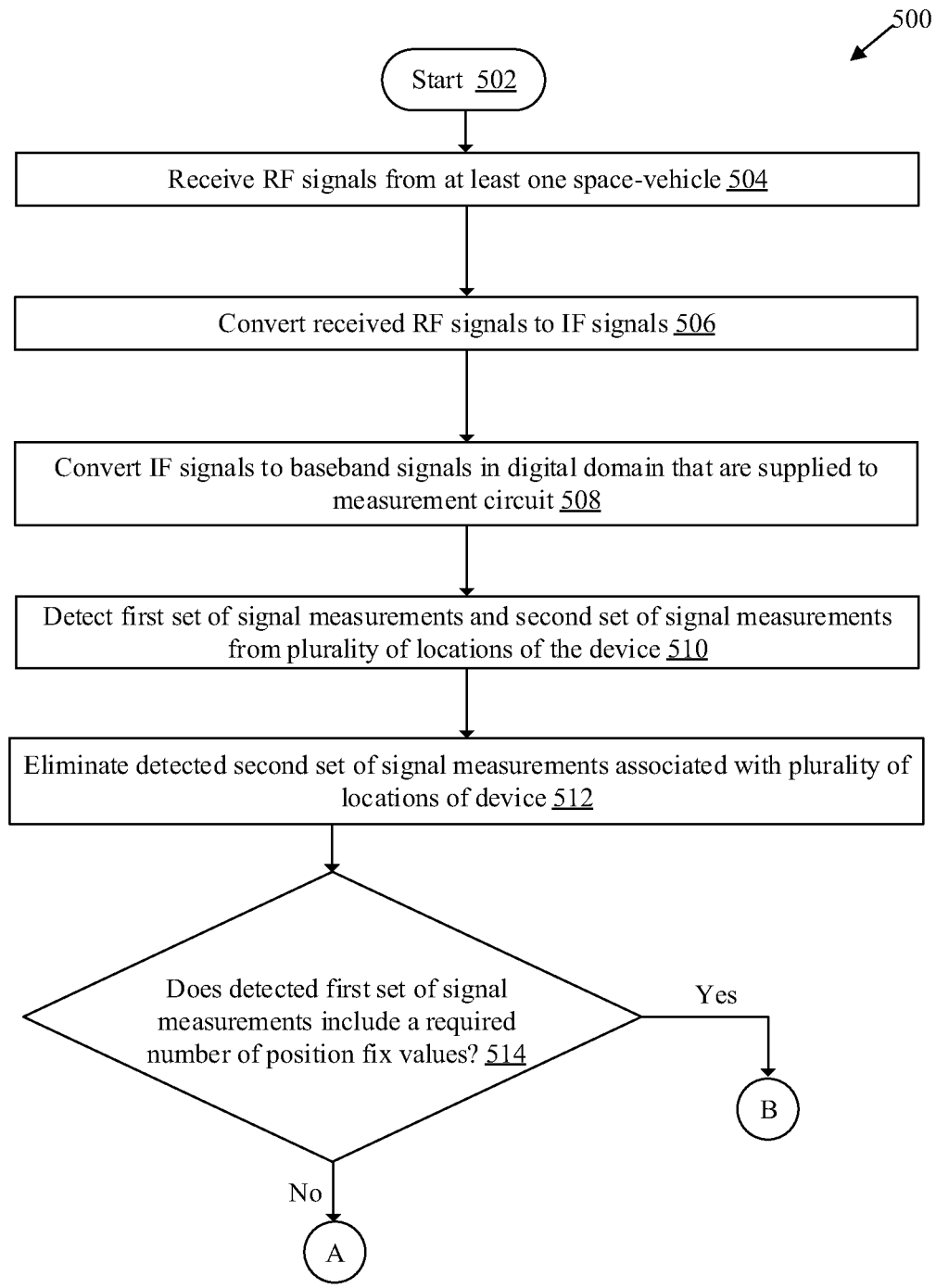
FIGS. 5A and 5B, collectively, depict a flowchart that illustrates exemplary operations of the device of FIG. 2 for the adaptive multi-rate navigation of the user, in accordance with an embodiment of the disclosure.
Figure 5B:
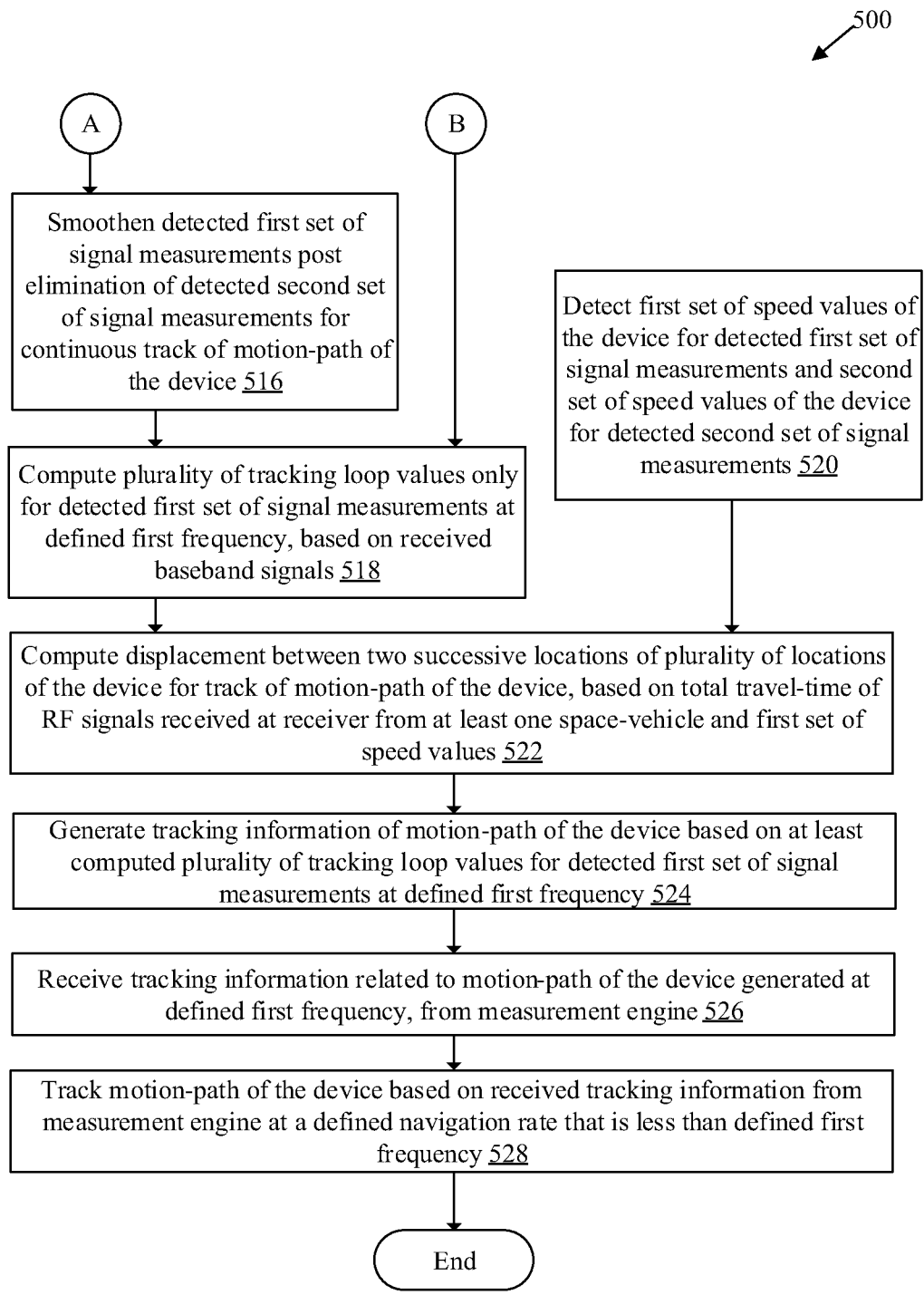

FIGS. 5A and 5B are flowcharts that collectively illustrate exemplary operations of a device for an adaptive multi-rate navigation, in accordance with an embodiment of the disclosure. With reference to FIGS. 5A and 5B, there is shown a flowchart 600. The flowchart 600 is described in conjunction with FIGS. 1, 2, 3, 4A and 4B. The operations from 504 to 526 may be implemented in the device 102. The operations of the flowchart 500 may start at 502 and proceed to 504.

At 504, RF signals may be received from one or more space vehicles 112. The receiver 104 of the device 102 may comprise the front-end circuit 214, which may be configured to receive the RF signals from one or more space vehicles 112 via the antenna 220. At 506, the received RF signals may be converted to IF signals. The front-end circuit 214 may comprise of the down-converter 222 that may be configured to convert the received RF signals to IF signals.

At 508, the IF signals may be converted to baseband signals in the digital domain that may be further supplied to measurement engine 216. The front-end circuit 214 may include the down-converter 222 that may be configured to convert the IF signals to baseband signals. The front-end circuit 214 may further include the (A/D) Converter 224 configured to convert the baseband signals from analog to digital domain.

At 510, the first set of signal measurements (e.g., the first set of signal measurements 402) and second set of signal measurements (e.g., the second set of signal measurements 404) may be detected for the plurality of locations of the device 102. The measurement engine 216 may be configured to detect the first set of signal measurements and the second set of signal measurements based on the computed plurality of integration values for the plurality of integration-time-periods. For example, the measurement engine 216 may be configured to detect the first set of signal measurements 402 and the second set of signal measurements 404 for the plurality of locations of the device 102 attached to/worn by the user 114 and engaged in a specific activity (as described, for example, in FIG. 2).

At 512, the detected second set of signal measurements (for e.g. the second set of signal measurements 404) may be eliminated for the plurality of locations of the device 102. The measurement engine 216 may eliminate the detected second set of signal measurements that may correspond to the plurality of position-fix values associated with the signal blockage of the baseband signals. The detected second set of signal measurements may represent the locations where the signal power value of the baseband signals is less than the signal power threshold. For example, as shown in FIG. 4, the detected second set of signal measurements 404 correspond to the underwater locations of the device 102 worn by the user 114 engaged in the swimming activity that may be associated with the signal blockage of the baseband signals.

At 514, it is determined whether the detected first set of signal measurements include a required number of position fix values. In accordance with an embodiment, the processor 202 may be configured to check whether the required number of position fix values are present in the detected first set of signal measurements. In an instance, when the first set of signal measurements include the required number of position fix values for an optimal number of location updates per second, control passes to 520. In another instance, when the required number of position fixes are absent in the first set of signal measurements, the control passes to 518.

At 516, the detected first set of signal measurements (for e.g. the first set of signal measurements 402) of the device 102 may be smoothened. The detected first set of signal measurements (for e.g. the first set of signal measurements 402) that may not include the required number of position fix values for the optimal number of locations may be smoothened based on at least one of the least-square fitting model, the M-estimator model, the single-state Kalman filter or the machine learning-based model. The measurement engine 216 may be configured to smoothen the detected first set of signal measurements to add resolution and robustness to the first set of signal measurements.

At 518, the plurality of tracking loop values may be computed only for the detected first set of signal measurements (e.g. the first set of signal measurements 402) at the defined first frequency, based on the received baseband signals. In some embodiments, the measurement engine 216 may be configured to compute the plurality of tracking loop values for the smoothened first set of signal measurements at the defined first frequency. The computed tracking loop values may be further utilized to track the motion-path of the device 102 worn by the user 114.

At 520, the first set of speed values of the device 102 may be detected for detected first set of signal measurements (for e.g. the first set of signal measurements 402) and the second set of speed values of device 102 for detected second set of signal measurements (for e.g. the second set of signal measurements 404). The device 102 may comprise the speed sensor 206 that may be configured to detect the first set of speed values and the second set of speed values for the device 102 worn by the user 114 engaged in the specific activity.

At 522, the displacement between two successive locations of the plurality of locations of the device 102 may be computed for the track of motion-path of device 102. The measurement engine 216 may be configured to compute the displacement between two successive locations. The displacement between two successive locations may be computed based on the total travel-time of RF signals received at receiver 104 from at least one space vehicle 112 and the detected first set of speed values.

At 524, tracking information of the motion-path of the device 102 may be generated at the defined first frequency. The measurement engine 216 may generate the tracking information based on at least the computed plurality of tracking loop values for the detected first set of signal measurements (e.g., the first set of signal measurements 402) and the first set of speed values. The measurement engine 216 may provide the generated tracking information of the motion-path of the device 102 to the navigation engine 218 at the defined first frequency (i.e., a defined tracking loop rate).

At 526, the tracking information related to the motion-path of the device 102 generated at a defined first rate, may be received by the navigation engine 218 from the measurement engine 216. The navigation engine 218 may be configured to use the received tracking information to track the actual motion-path of the device 102 worn by the user 114 when the user 114 is engaged in the specific activity.

At 528, the actual motion-path of the device 102 may be tracked based on the received tracking information from measurement engine 216. The navigation engine 218 may update the locations of the tracked motion-path of the device 102 at the defined navigation rate that is less than the defined first frequency (i.e., defined tracking loop rate). For example, as shown in FIG. 4, the navigation engine 218 may be configured to generate an arm trajectory 406 of the user 114 engaged in the swimming activity. Control passes to end.

In accordance with an embodiment of the disclosure, a system for adaptive multi-rate navigation is disclosed. The system, such as the device 102 (FIG. 1), may comprise a memory device (such as the memory 204) and one or more circuits (such as the receiver 104, processor 202, the speed sensor 206, the front-end circuit 214, the measurement engine 216 and the navigation engine 218 (FIG. 2) coupled to an electronic device (such as the electronic device 106). The receiver 104 may be configured to receive RF signals from one or more satellites (such as the one or more space vehicles 112). The front-end circuit 214 may be configured to convert the received RF signals to baseband signals in digital domain and provide the baseband signals to measurement engine 216. A plurality of locations of the device 102 worn by the user 114 may be acquired by the measurement engine 216 from baseband signals received at the measurement engine 216 in digital domain. The measurement engine 216 may be configured to detect a first set of signal measurements (such as the first set of signal measurements 402 (FIG. 4)) and a second set of signal measurements (such as the second set of signal measurements 404 (FIG. 4)) for the plurality of locations of the device 102. The measurement engine 216 may be configured to eliminate the detected second set of signal measurements (such as the second set of signal measurements 404 (FIG. 4)) for the plurality of locations of the device 102. The detected second set of signal measurements may correspond to a plurality of position-fix values associated with signal blockage of the baseband signals. The measurement engine 216 may be configured to compute a plurality of tracking loop values only for the detected first set of signal measurements (such as the first set of signal measurements 402 (FIG. 4)) at a defined first frequency, based on the received baseband signals. The measurement engine 216 may be configured to track a motion-path of the device 102, at the defined first frequency, based on at least the computed plurality of tracking loop values for the detected first set of signal measurements (such as the first set of signal measurements 402 (FIG. 4)). The navigation engine 218 may be configured to update the tracked locations and generate a trajectory (such as the arm trajectory 406 (FIG. 4)) of the motion-path of the device 102 worn by the user 114, at the defined navigation rate.

Various embodiments of the disclosure may provide a non-transitory, computer-readable medium and/or storage medium, and/or a non-transitory machine readable medium and/or storage medium stored thereon, a set of instructions executable by a machine and/or a computer to track a motion-path of a device worn by a user in motion. The set of instructions may be executable by the machine and/or the computer to perform the steps that comprise detection of the first set of signal measurements and the second set of signal measurements for a plurality of locations of the device attached to the user. The plurality of locations of the device are acquired from baseband signals received at a measurement engine in the digital domain. The detected second set of signal measurements for the plurality of locations of the device are eliminated. The detected second set of signal measurements correspond to a plurality of position-fix values associated with signal blockage of the baseband signals. Further, a plurality of tracking loop values are computed only for the detected first set of signal measurements at a defined first frequency, based on the received baseband signals. Thereafter, the motion-path of the device worn by the user may be tracked at the defined first frequency based on at least the computed plurality of tracking loop values for the detected first set of signal measurements.

The present disclosure provides several advantages over the prior arts. The present disclosure facilitates precise detection and tracking of granular movements of the specific body part of the user, at different rates or measurement. Such detection and tracking at the measurement engine level of the receiver facilitates faster output with lower power consumption, as compared to conventional receivers that utilize significant power to provide high definition tracking at a level of navigation engine. As the power consumption of the receiver 104 is optimal, power load on the battery of the device 102 is minimized, and therefore, the device 102 may be rendered for use in multitasking applications for an increased duration of time. The receiver 104 advantageously captures motion-path of a specific body part of the user 114 at a higher rate even with the intermittent loss of signals due to recurrent signal blockages (caused by ambient environment or a medium exposed to the device 102, for example, when the device is underwater, coordinated blanking signal while other RF source is transmitting). Use of smoothening techniques advantageously compensates the intermittent drop in an optimal measurement of granular location points with the movement of the specific body part of the user. Such compensation may advantageously facilitate continuous output of high definition/high-resolution location points, which may further help preserve integrity, sensitivity, and throughput of the disclosed receiver.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without deviation from the scope of the present disclosure. In addition, many modifications may be made to adapt a particular situation or material to the teachings of the present disclosure without deviation from its scope. Therefore, it is intended that the present disclosure not be limited to the particular embodiment disclosed, but that the present disclosure will include all embodiments falling within the scope of the appended claims.

What is claimed is:

1. A device, comprising:
  a processor; and
  a receiver that includes:
    a measurement engine configured to:
      receive baseband signals in digital domain;
      acquire a plurality of locations of the device based on the baseband signals;
      detect, from the baseband signals, a first set of signal measurements and a second set of signal measurements for the plurality of locations of the device, wherein
        the detected first set of signal measurements corresponds to a measure of a first plurality of position-fix values,
        the detected second set of signal measurements corresponds to a measure of a second plurality of position-fix values, and
        the second plurality of position-fix values is associated with signal blockage of the baseband signals;
      eliminate the detected second set of signal measurements;
      smoothen the detected first set of signal measurements subsequent to the elimination of the detected second set of signal measurements, wherein
        the processor is configured to determine that the first plurality of position-fix values is less than a specific number of position-fix values,
        the detected first set of signal measurements is smoothened based on the determination that the first plurality of position-fix values is less than the specific number of position-fix values, and
        the specific number of position-fix values is based on a specific frequency;

compute a plurality of tracking loop values only for the smoothened first set of signal measurements at the specific frequency, wherein the baseband signals are tracked based on the plurality of tracking loop values; and generate tracking information based on the smoothened first set of signal measurements; and a navigation engine configured to:
receive the tracking information; and
track, at the specific frequency, a motion-path of the device based on the tracking information.

2. The device according to claim 1, wherein
the receiver further comprises a front-end circuit communicatively coupled to the measurement engine, and
the front-end circuit is configured to:
receive radio frequency (RF) signals from at least one space vehicle;
convert the received RF signals to intermediate frequency (IF) signals;
convert the IF signals to the baseband signals in the digital domain; and
transmit the baseband signals to the measurement engine.

3. The device according to claim 1, wherein
the first plurality of position-fix values is associated with receipt of radio frequency (RF) signals, and
a signal quality value of the RF signals is greater than a signal quality threshold during motion of the device.

4. The device according to claim 1, wherein
the measurement engine is further configured to compute, at the specific frequency, a plurality of integration-values for a plurality of integration-time-periods of the baseband signals,
a count of the plurality of integration-values and a count of the plurality of integration-time-periods are same, and
the count of the plurality of integration-values and the count of the plurality of integration-time-periods are based on the specific frequency.

5. The device according to claim 4, wherein the plurality of integration-values is computed based on at least one of coherent integration or non-coherent integration of the baseband signals and a reference signal at the measurement engine.

6. The device according to claim 4, wherein
the measurement engine is further configured to detect the second set of signal measurements for the plurality of locations of the device, based on the plurality of integration-values that is less than a threshold signal power value, and
the plurality of integration-values that is less than the threshold signal power value indicates the signal blockage of the baseband signals for the detected second set of signal measurements.

7. The device according to claim 1, wherein
the detected first set of signal measurements is smoothened for a continuous track of the motion-path of the device, and
the detected first set of signal measurements is smoothened by at least one of an M-estimator model or a Kalman filter.

8. The device according to claim 1, wherein the detected first set of signal measurements for the plurality of locations of the device is smoothened by at least one of a Kalman filter or a machine learning-based model.

9. The device according to claim 1, further comprising a speed sensor communicatively coupled to the receiver, wherein
the speed sensor is configured to provide a first set of speed values of the device for the detected first set of signal measurements and a second set of speed values of the device for the detected second set of signal measurements, and
the motion-path of the device is tracked based on the first set of speed values.

10. The device according to claim 1, further comprising a speed sensor communicatively coupled to the receiver, wherein
the speed sensor is configured to provide a first set of speed values of the device for the detected first set of signal measurements,
the receiver further comprises a front-end circuit communicatively coupled to the measurement engine,
the front-end circuit is configured to receive radio frequency (RF) signals from at least one space vehicle,
the measurement engine is further configured to:
determine a total travel-time of the RF signals based on a match of a specific code of the baseband signals with a reference code; and
compute a displacement between two successive locations of the plurality of locations of the device for the track of the motion-path of the device, and
the computation of the displacement is based on the first set of speed values of the device and the total travel-time of the RF signals.

11. The device according to claim 1, further comprising a speed sensor communicatively coupled to the receiver, wherein
the speed sensor is configured to provide a second set of speed values of the device for the detected second set of signal measurements,
the measurement engine is further configured to detect the second set of signal measurements of the device based on a deviation of the second set of speed values from a specific speed pattern, and
the deviation is based on the signal blockage of the baseband signals.

12. The device according to claim 1, wherein
the measurement engine is further configured to:
compute a displacement between two successive locations of the plurality of locations of the device; and
generate the tracking information related to the motion-path of the device at the specific frequency based on the computation of the displacement, and
the navigation engine is communicatively coupled to the measurement engine.

13. The device according to claim 12, wherein the navigation engine is further configured to track, at a navigation rate that is less than the specific frequency of the measurement engine, the motion-path of the device based on the tracking information received from the measurement engine.

14. The device according to claim 13, wherein
the navigation rate of the navigation engine corresponds to a tracking rate that is in a range of 0.5 to 2 Hertz (Hz) to achieve a power dissipation value less than a threshold power, and
the specific frequency of the measurement engine corresponds to the tracking rate that is in a range of 5 to 10 Hz.

15. The device according to claim 12, wherein the navigation engine is further configured to generate, based on the tracked motion-path of the device, an arm trajectory of a user engaged in a swimming activity that involves repetitive motion of arms along with a travel direction.

16. The device according to claim 15, wherein
the detected second set of signal measurements corresponds to underwater locations of the device, and
the device is wearable by the user engaged in the swimming activity.

17. The device according to claim 1, wherein
the specific frequency corresponds to a tracking loop rate, and
the baseband signals correspond to Global Navigation Satellite System (GNSS) baseband signals.

18. A receiver, comprising:
a measurement engine configured to:
  receive baseband signals in digital domain;
  acquire a plurality of locations of the receiver based on the baseband signals;
  detect, from the baseband signals, a first set of signal measurements and a second set of signal measurements for the plurality of locations of the receiver, wherein
    the detected first set of signal measurements corresponds to a measure of a first plurality of position-fix values,
    the detected second set of signal measurements corresponds to a measure of a second plurality of position-fix values, and
    the second plurality of position-fix values is associated with signal blockage of the baseband signals;
  eliminate the detected second set of signal measurements;
  smoothen the detected first set of signal measurements subsequent to the elimination of the detected second set of signal measurements, wherein
    the detected first set of signal measurements is smoothened based on a determination that the first plurality of position-fix values is less than a specific number of position-fix values, and
    the specific number of position-fix values is based on a specific frequency;
  compute a plurality of tracking loop values only for the smoothened first set of signal measurements at the specific frequency, wherein the baseband signals are tracked based on the plurality of tracking loop values; and
  generate tracking information based on the smoothened first set of signal measurements; and
a navigation engine configured to:
  receive the tracking information; and
  track, at the specific frequency, a motion-path of the receiver based on the tracking information.

19. A method, comprising:
in a device that includes a processor and a receiver:
  receiving, by a measurement engine of the receiver, baseband signals in digital domain;
  acquiring, by the measurement engine, a plurality of locations of the device based on the baseband signals;
  detecting, by the measurement engine, a first set of signal measurements and a second set of signal measurements for the plurality of locations of the device from the baseband signals, wherein
    the detected first set of signal measurements corresponds to a measure of a first plurality of position-fix values,
    the detected second set of signal measurements corresponds to a measure of a second plurality of position-fix values, and
    the second plurality of position-fix values is associated with signal blockage of the baseband signals;
  eliminating, by the measurement engine, the detected second set of signal measurements;
  determining, by the processor, the first plurality of position-fix values is less than a specific number of position-fix values;
  smoothening, by the measurement engine, the detected first set of signal measurements subsequent to the elimination of the detected second set of signal measurements, wherein
    the detected first set of signal measurements is smoothened based on the determination that the first plurality of position-fix values is less than the specific number of position-fix values, and
    the specific number of position-fix values is based on a specific frequency;
  computing, by the measurement engine, a plurality of tracking loop values only for the smoothened first set of signal measurements at the specific frequency, wherein the baseband signals are tracked based on the plurality of tracking loop values;
  generating, by the measurement engine, tracking information based on the smoothened first set of signal measurements;
  receiving, by a navigation engine of the receiver, the tracking information; and
  tracking, by the navigation engine, at the specific frequency, a motion-path of the device based on the tracking information.

20. The method according to claim 19, further comprising:
  computing, by the measurement engine, a displacement between two successive locations of the plurality of locations of the device; and
  generating, by the measurement engine, the tracking information related to the motion-path of the device at the specific frequency based on the computation of the displacement.

21. The method according to claim 20, further comprising tracking, by the navigation engine, at a navigation rate that is less than the specific frequency of the measurement engine, the motion-path of the device based on the tracking information received from the measurement engine.

22. The method according to claim 21, wherein
the navigation rate of the navigation engine corresponds to a tracking rate that is in a range of 0.5 to 2 Hertz (Hz) to achieve a power dissipation value less than a threshold power, and
the specific frequency of the measurement engine corresponds to the tracking rate that is in a range of 5 to 10 Hz.

* * * * *